(12) United States Patent
Yoon et al.

(10) Patent No.: US 12,074,316 B2
(45) Date of Patent: Aug. 27, 2024

(54) ELECTRODE FOR LITHIUM SECONDARY BATTERY

(71) Applicant: LG CHEM, LTD., Seoul (KR)

(72) Inventors: Jihee Yoon, Daejeon (KR); Taek Soo Lee, Daejeon (KR); Sang Hoon Choy, Daejeon (KR); Cheolwoo Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 807 days.

(21) Appl. No.: 17/262,068

(22) PCT Filed: Apr. 2, 2020

(86) PCT No.: PCT/KR2020/004511
§ 371 (c)(1),
(2) Date: Jan. 21, 2021

(87) PCT Pub. No.: WO2020/204625
PCT Pub. Date: Oct. 8, 2020

(65) Prior Publication Data
US 2021/0296640 A1  Sep. 23, 2021

(30) Foreign Application Priority Data
Apr. 4, 2019 (KR) .................. 10-2019-0039670

(51) Int. Cl.
*H01M 4/36* (2006.01)
*H01M 4/131* (2010.01)
(Continued)

(52) U.S. Cl.
CPC ........... *H01M 4/366* (2013.01); *H01M 4/131* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS 8,841,026 B2  9/2014  Park et al.
9,276,259 B2  3/2016  Chang et al.
(Continued)

FOREIGN PATENT DOCUMENTS

CN  102742050 A  10/2012
CN  103165856 A  6/2013
(Continued)

OTHER PUBLICATIONS

Office action issued Jul. 30, 2023, by the Chinese Patent Office corresponding to CN Patent Application No. 202080003204.4.
(Continued)

*Primary Examiner* — Jonathan G Leong
*Assistant Examiner* — Tony S Chuo
(74) *Attorney, Agent, or Firm* — MORGAN, LEWIS & BOCKIUS LLP

(57) ABSTRACT

Provided is an electrode for a lithium secondary battery having excellent resistance and output characteristics while achieving high capacity characteristics due to a high active material content.

18 Claims, 1 Drawing Sheet

(51) Int. Cl.
  *H01M 4/505* (2010.01)
  *H01M 4/525* (2010.01)
  *H01M 10/0525* (2010.01)
  *H01M 4/02* (2006.01)

(52) U.S. Cl.
  CPC .. *H01M 10/0525* (2013.01); *H01M 2004/021* (2013.01); *H01M 2004/028* (2013.01)

(56) References Cited

U.S. PATENT DOCUMENTS

| | | |
|---|---|---|
| 9,543,568 B2 | 1/2017 | Sung et al. |
| 9,666,862 B2 | 5/2017 | Chang et al. |
| 10,038,193 B1 | 7/2018 | Schroder et al. |
| 10,797,305 B2 | 10/2020 | Kim |
| 2013/0147439 A1 | 6/2013 | Takahashi |
| 2013/0216897 A1 | 8/2013 | Kim et al. |
| 2016/0013480 A1 | 1/2016 | Sikha et al. |
| 2017/0263929 A1* | 9/2017 | Wu ............... H01M 4/131 |
| 2017/0346133 A1 | 11/2017 | Je et al. |
| 2018/0145322 A1* | 5/2018 | Choi ............... H01M 4/525 |
| 2019/0013545 A1 | 1/2019 | Kim et al. |
| 2019/0027740 A1 | 1/2019 | Lee et al. |
| 2019/0036125 A1 | 1/2019 | Schroder et al. |
| 2019/0267664 A1* | 8/2019 | Lin ............... H01M 4/58 |
| 2020/0091515 A1* | 3/2020 | Takezawa ......... H01M 4/485 |
| 2020/0343536 A1 | 10/2020 | Suh et al. |
| 2021/0296640 A1 | 9/2021 | Yoon et al. |
| 2023/0155127 A1 | 5/2023 | Kim et al. |

FOREIGN PATENT DOCUMENTS

| | | |
|---|---|---|
| CN | 105074967 A | 11/2015 |
| CN | 108604674 A | 9/2018 |
| EP | 3399576 A1 | 11/2018 |
| JP | 2013-120736 A | 6/2013 |
| JP | 2013-149403 A | 8/2013 |
| JP | 2014-143063 A | 8/2014 |
| JP | 2016-510941 A | 4/2016 |
| JP | 2017-157529 A | 9/2017 |
| JP | 6327011 B2 | 5/2018 |
| JP | 3227744 U | 9/2020 |
| KR | 10-2006-0094050 A | 8/2006 |
| KR | 2012-0034059 A | 4/2012 |
| KR | 10-1407085 B1 | 6/2014 |
| KR | 10-2015-0029054 A | 3/2015 |
| KR | 10-1754800 B1 | 7/2017 |
| KR | 10-2017-0103184 A | 9/2017 |
| KR | 10-2017-0107921 A | 9/2017 |
| KR | 10-2018-0118913 A | 11/2018 |
| KR | 10-2019-0051864 A | 5/2019 |
| KR | 10-2020-0117496 A | 10/2020 |
| KR | 10-2022-0110122 A | 8/2022 |
| KR | 10-2023-0001442 A | 1/2023 |
| WO | 2018/221024 A1 | 12/2018 |
| WO | WO 2018/221024 A1 * | 12/2018 ............ H01M 4/131 |

OTHER PUBLICATIONS

Extended European Search Report issued in the corresponding European Patent Application No. 20782366.7 dated Oct. 1, 2021.
International Search Report (with partial translation) and Written Opinion dated Jul. 8, 2020, issued in corresponding International Patent Application No. PCT/KR2020/004511.
Extended European Search Report issued Oct. 9, 2023 for corresponding European Patent Application No. 23180188.7.

* cited by examiner

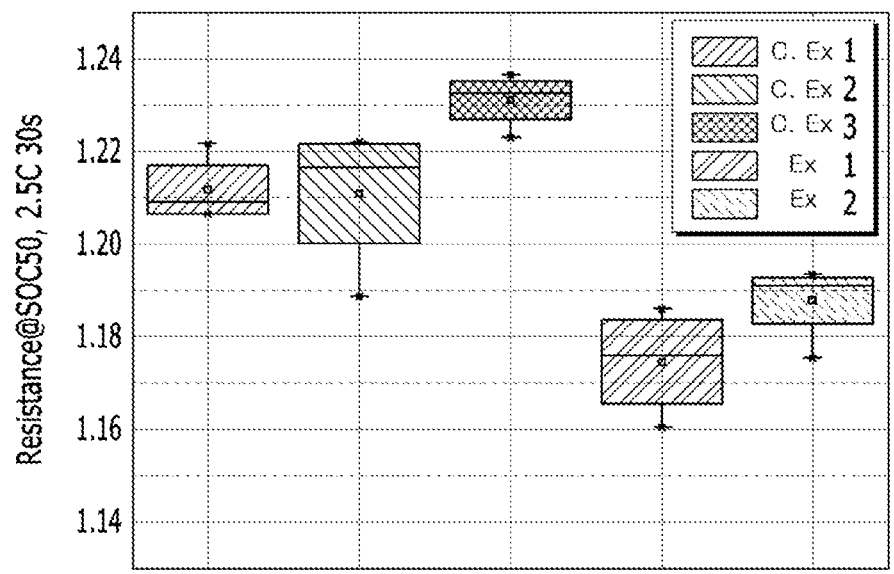

ELECTRODE FOR LITHIUM SECONDARY BATTERY

TECHNICAL FIELD

Cross-Reference to Related Application

The present application is based on, and claims priority from, Korean Patent Application No. 10-2019-0039670, filed on Apr. 4, 2019, the disclosure of which is hereby incorporated by reference herein in its entirety.

The present invention relates to an electrode for a lithium secondary battery having excellent resistance and output characteristics.

BACKGROUND ART

Recently, with increasing demands for electric vehicles (EVs), hybrid electric vehicles (HEVs), etc., the need for lithium secondary batteries having a high energy density, a high discharge voltage, and output stability as their power sources is expanding.

In order to realize high capacity characteristics of lithium secondary batteries, it is necessary to improve a loading capacity of an electrode, which increases an active material content of the electrode and thickness of the electrode. At this time, conductivity of the electrode is not sufficiently secured, and thus resistance and output characteristics of the electrode are deteriorated, resulting in reduction of battery performance.

Accordingly, in order to achieve high capacity and high output characteristics of the lithium secondary battery, it is necessary to develop an electrode for a lithium secondary battery, which has excellent conductivity, low resistance, and excellent output characteristics while having a high loading capacity.

DISCLOSURE

Technical Problem

An object of the present invention is to provide an electrode for a lithium secondary battery, which has excellent resistance and output characteristics while achieving high capacity characteristics due to a high active material content.

Technical Solution

To achieve the above object, there is provided an electrode for a lithium secondary battery, the electrode including a current collector; a first active material layer formed on the current collector; and a second active material layer formed on the first active material layer, wherein the first active material layer and the second active material layer include, as active materials, an active material A having a D50 particle size of 7 μm to 15 μm and an active material B having a D50 particle size of 2 μm or more to less than 7 μm, the first and second active material layers are different from each other in term of a weight ratio of the active material A:the active material B, and a ratio of the active material A in the second active material layer is higher than that in the first active material layer, and the weight ratio of the active material A:the active material B in the second active material layer is more than 70:30.

In this regard, the weight ratio of the active material A:the active material B in the first active material layer may be more than 50:50 to 70:30 or less, and the weight ratio of the active material A:the active material B in the second active material layer may be more than 70:30 to 95:5 or less.

In this regard, the weight ratio of the active material A:the active material B in the first active material layer may be 60:40 to 70:30, and the weight ratio of the active material A:the active material B in the second active material layer may be 80:20 to 90:10.

In a specific embodiment, the D50 particle size of the active material A may be 7 μm to 11 μm and the D50 particle size of the active material B may be 2 μm to 6 μm.

In another specific embodiment, the D50 particle size of the active material A may be 8 μm to 10.5 μm and the D50 particle size of the active material B may be 3.5 μm to 6 μm.

The active material A and the active material B may be homogeneous or heterogeneous positive electrode active materials.

In this regard, the positive electrode active material may be lithium-manganese oxides, lithium-cobalt oxides, lithium-nickel oxides, lithium-nickel-manganese oxides, lithium-nickel-cobalt oxides, lithium-manganese-cobalt oxides, lithium-nickel-manganese-cobalt oxides, or lithium-nickel-cobalt-transition metal (M) oxide (wherein M is one or more selected from the group consisting of Al, Fe, V, Cr, Ti, Ta, Mg, and Mo).

In one embodiment, the active material A and the active material B may be homogeneous compounds, and may be lithium-nickel-manganese-cobalt oxides.

A loading capacity deviation between the first active material layer and the second active material layer may be 0% to 10%.

The first active material layer and the second active material layer may have a loading capacity of 12 mg/cm$^2$ to 16 mg/cm$^2$, respectively.

The first active material layer and the second active material layer may have a thickness of 35 μm to 45 μm, respectively.

Effect of the Invention

An electrode of the present invention has excellent resistance and output characteristics while having a high capacity, thereby being suitably applied to a lithium secondary battery requiring a high capacity and a high output power.

BRIEF DESCRIPTION OF DRAWINGS

The Drawing shows the results of a resistance test of batteries of Examples 1 and 2 and Comparative Examples 1 to 3.

DETAILED DESCRIPTION OF THE EMBODIMENTS

While the present invention is susceptible to various modifications and alternative forms, specific embodiments will be illustrated and described in detail as follows. It should be understood, however, that the description is not intended to limit the present invention to the particular forms disclosed, but on the contrary, the intention is to cover all modifications, equivalents, and alternatives falling within the spirit and technical scope of the invention.

Hereinafter, the present invention will be described in detail.

According to one embodiment of the present invention, provided is an electrode for a lithium secondary battery, the electrode including a current collector: a first active material layer formed on the current collector; and a second active material layer formed on the first active material layer, wherein the first active material layer and the second active material layer include, as active materials, an active material A having a D50 particle size of 7 μm to 15 μm and an active material B having a D50 particle size of 2 μm or more to less than 7 μm, the first and second active material layers are different from each other in terms of a weight ratio of the active material A:the active material B, and a ratio of the active material A in the second active material layer is higher than that in the first active material layer, and the weight ratio of the active material A:the active material B in the second active material layer is more than 70:30.

As used herein, the particle size (Dn) refers to a particle size at the point of n volume % on a cumulative distribution of the number of particles according to the particle size, when the particle sizes of the particles are accumulated in ascending order. In other words, D50 refers to a particle size at the 50% point on the cumulative distribution of the number of particles according to the particle size, D90 refers to a particle size at the 90% point on the cumulative distribution of the number of particles according to the particle size, and D10 refers to a particle size at the 10% point on the cumulative distribution of the number of particles according to the particle size.

The Dn may be measured by using a laser diffraction method. In detail, powder to be measured is dispersed in a dispersion medium, and then is introduced into a commercially available laser diffraction particle size analyzer (e.g., Microtrac S3500). The particle size distribution is determined by measuring the diffraction pattern difference according to the particle size, when a laser beam passes through particles. D10, D50, and D90 may be determined by calculating the particle size at the 10%, 50%, and 90% points on the cumulative distribution of the number of particles according to the particle size in the analyzer.

In the present invention, as the electrode active material, active materials having a bi-modal particle size distribution of a small particle size and a large particle size are used, wherein the active material layer is configured to have multiple layers, and each layer has a different ratio of the small particle size active material and the large particle size active material, thereby reducing resistance of a high-capacity electrode and improving output characteristics thereof.

Specifically, the electrode for a lithium secondary battery of the present invention includes a high content of the large particle size active material in the second active material layer on the surface of the electrode farther from the current collector, as compared with the first active material layer close to the electrode current collector, and therefore, even when the active material content is increased, the electrode may exhibit stable conductivity and low resistance.

More specifically, the present invention includes, as active material layers, the first active material layer formed on the current collector and the second active material layer formed on the first active material layer, wherein the first active material layer and the second active material layer each include the active material A and the active material B of which D50 particle sizes are different from each other.

The active material A is an active material having a relatively large particle size, and its D50 particle size is 7 μm to 15 μm. The active material B is an active material having a relatively small particle size, and its D50 particle size is 2 μm or more to less than 7 μm. As described, when a mixture of the large particle size active material and the small particle size active material is used, packing density and power density may be improved, and the thickness of the electrode may be reduced, thereby maximizing the energy density of the electrode.

In this regard, when the active material A is an excessively large D50 particle size of more than 15 μm, there is a problem in that the energy density may be reduced. When the active material B is an excessively small D50 particle size of less than 2 μm, there is a problem in that lifespan and storage characteristics may become poor due to increased resistance. For this reason, it is preferable that the active materials meet the above range of particle size.

In one embodiment, the D50 particle size of the active material A may be 7 μm to 11 μm, or 8 μm to 10.5 μm, and the D50 particle size of the active material B may be 2 μm to 6 μm, or 3.5 μm to 6 μm. In this regard, a maximum particle size (D95) of the active material A is preferably less than 12 μm, and a minimum particle size (D5) of the active material B is preferably 2 μm or more.

Further, when the D50 particle size deviation between the large particle size active material and the small particle size active material is too small, the effect of packing density is deteriorated. Therefore, the D50 particle size deviation between the active material A and the active material B is preferably 4 μm or more, while each satisfying the above-described range of the D50 particle size.

In the present invention, it is preferable that the weight ratio of active material A:active material B in the second active material layer exceeds 70:30, and thus the proportion of the active material A is higher than that of the active material B. As described, when the ratio of the large particle size active material is high at the electrode surface, that is, at the region in contact with an electrolyte and a separator, penetration of the electrolyte may be easily improved, and thus ion conductivity may be improved, thereby achieving the effect on output characteristics. In one embodiment, the weight ratio of active material A:active material B in the second active material layer may be more than 70:30 to 95:5 or less, or 80:20 to 90:10.

It is also preferable that the first active material layer formed on the electrode current collector has a higher proportion of the active material A than that of the active material B. However, in terms of realizing the effect of the present invention, it is more preferable that the ratio of the active material A in the first active material layer is lower than that in the second active material layer. Specifically, the weight ratio of active material A:active material B in the first active material layer may be more than 50:50 to 70:30 or less, or 60:40 to 70:30.

A total content of the active material A and the active material B in the first active material layer and the second active material layer is not particularly limited. However, in terms of securing high capacity characteristics, the total content may be 80% by weight or more, or 90% by weight or more, and 99% by weight or less, or 97% by weight or less, based on the total weight of each active material layer. In this regard, as long as the total content of the active materials in the first active material layer and the second active material layer satisfies the above range, they may be the same as or different from each other.

The electrode for a lithium secondary battery of the present invention may be a positive electrode or a negative electrode according to the active material to be used.

When the electrode for a lithium secondary battery of the present invention is a positive electrode, the active material A and the active material B may be homogeneous or heterogeneous positive electrode active materials.

The positive electrode active material is a compound capable of reversible intercalation and deintercalation of lithium, and any compound known in the art may be used without limitation. Specifically, the positive electrode active material may be lithium composite metal oxide including one or more metals such as cobalt, manganese, nickel, or aluminum, and lithium.

As the lithium composite metal oxide, lithium-manganese oxides (e.g., $LiMnO_2$, $LiMn_2O_4$, etc.), lithium-cobalt oxides (e.g., $LiCoO_2$, etc.), lithium-nickel oxides (e.g., $LiNiO_2$, etc.), lithium-nickel-manganese oxides (e.g., $LiNi_{1-Y}Mn_YO_2$ (wherein $0<Y<1$), $LiMn_{2-Z}Ni_ZO_4$ (wherein $0<Z<2$), etc.), lithium-nickel-cobalt oxides (e.g., $LiNi_{1-Y1}Co_{Y1}O_2$ (wherein $0<Y1<1$), etc.), lithium-manganese-cobalt oxides (e.g., $LiCo_{1-Y2}Mn_{Y2}O_2$ (wherein $0<Y2<1$), $LiMn_{2-Z1}Co_{Z1}O_4$ (wherein $0<Z1<2$), etc.), lithium-nickel-manganese-cobalt oxides (e.g., $Li(Ni_pCO_qMn_{r1})O_2$ (wherein $0<p<1$, $0<q<1$, $0<r1<1$, $p+q+r1=1$) or $Li(Ni_{p1}Co_{q1}Mn_{r2})O_4$ (wherein $0<p1<2$, $0<q1<2$, $0<r2<2$, $p1+q1+r2=2$), etc.), or lithium-nickel-cobalt-transition metal (M) oxides (e.g., $Li(Ni_{p2}CO_{q2}Mn_{r3}M_{s2})O_2$ (wherein M is one or more selected from the group consisting of Al, Fe, V, Cr, Ti, Ta, Mg, and Mo, and p2, q2, r3, and s2 are atomic fraction of each independent elements, wherein $0<p2<1$, $0<q2<1$, $0<3<1$, $0<s2<1$, $p2+q2+r3+s2=1$), etc.), and any one or two or more thereof may be included.

Among them, in terms of improving capacity characteristics and stability of the battery, the lithium composite metal oxide may include $LiCoO_2$, $LiMnO_2$, $LiNiO_2$, lithium nickel-manganese-cobalt oxides (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$, etc.), or lithium nickel-cobalt-aluminum oxides (e.g., $Li(Ni_{0.8}Co_{0.15}Al_{0.05})O_2$, etc.), etc.

In one embodiment of the present invention, the active material A and the active material B are homogeneous compounds, and they may be lithium-nickel-manganese-cobalt oxides. Lithium-nickel-manganese-cobalt oxides, also called NCM-based active materials, may be preferably used, because they are economical due to replacement of some of the expensive cobalt ingredients by manganese, and they also has high capacity characteristics and stability. Specifically, the active material A and the active material B may be $Li(Ni_{0.6}Mn_{0.2}Co_{0.2})O_2$, $Li(Ni_{0.8}Mn_{0.3}Co_{0.2})O_2$, or $Li(Ni_{0.8}Mn_{0.1}Co_{0.1})O_2$, each satisfying the above range of the D50 particle size.

When the electrode for a lithium secondary battery of the present invention is a negative electrode, the active material A and the active material B may be homogeneous or heterogeneous negative electrode active materials.

As the negative electrode active material, any compound known in the art may be used without limitation, and for example, crystalline carbon such as natural graphite, artificial graphite, etc.; soft carbon, hard carbon, mesophase pitch carbide, fired cokes, etc.; alloy of lithium and a metal of Na, K, Rb, Cs, Fr, Be, Mg, Ca, Sr, Si, Sb, Pb, In, Zn, Ba, Ra, Ge, Al, or Sn; materials capable of doping and dedoping lithium, such as Si, $SiO_x(0<x<2)$, Si—C composite, Si-Q alloy (wherein Q is an alkali metal, an alkaline-earth metal, an element of Group 13 to Group 16, a transition metal, a rare earth element, or a combination thereof, excluding Si), Sn, $SnO_2$, Sn—C composite, Sn—R (wherein R is an alkali metal, an alkaline-earth metal, an element of Group 13 to Group 16, a transition metal, a rare earth element, or a combination thereof, excluding Sn), etc. may be used, but is not limited thereto.

In the electrode for a lithium secondary battery of the present invention, the first active material layer and the second active material layer may have the same or different loading capacity. However, when the loading capacity deviation is too large, it is difficult to secure the effect of the present invention. Therefore, the loading capacity deviation between the first active material layer and the second active material layer may be preferably 0% to 10% or 0% to 7%.

Further, to achieve high capacity characteristics, the first active material layer and the second active material layer may have the loading capacity in the range of 12 mg/cm$^2$ to 16 mg/cm$^2$, respectively.

Meanwhile, the first active material layer and the second active material layer preferably have a thickness in the range of 35 μm to 45 μm, respectively. A total thickness of the two active material layers is preferably 90 μm or less. If the total thickness of the electrode active material layers is too thick and exceeds 90 μm, it is difficult to control the resistance increase of the electrode, even though a mixing ratio of the large particle size active material and the small particle size active material in each layer is controlled. Therefore, it is preferable that the thickness satisfies the above range.

The first active material layer and the second active material layer may include a conductive material and a binder, in addition to the above-described active materials.

The conductive material is used to provide the electrode with conductivity, and any electrically conductive material may be used as long as it does not cause chemical changes in a battery. Examples thereof may include conductive materials including a carbon-based material such as natural graphite, artificial graphite, carbon black, acetylene black, ketjen black, a carbon fiber, etc.; a metal-based material of a metal powder or a metal fiber such as copper, nickel, aluminum, silver, etc.; a conductive polymer such as a polyphenylene derivative, etc.; or a mixture thereof.

The binder functions to improve binding of active material particles with one another and with a current collector. Representative examples thereof may include polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, etc., but are not limited thereto.

The current collector is not particularly limited as long as it does not cause chemical changes in the battery while having high conductivity. For example, the positive electrode current collector may be made of stainless steel, aluminum, nickel, titanium, sintered carbon, or aluminum or stainless steel which is surface-treated with carbon, nickel, titanium, silver, etc. The negative electrode current collector may be made of copper, stainless steel, aluminum, nickel, titanium, sintered carbon, or copper or stainless steel which is surface-treated with carbon, nickel, titanium, silver, etc., or an aluminum-cadmium alloy, etc.

In addition, the current collector may be used in any of various forms including films, sheets, foils, nets, porous structures, foams, non-woven fabrics, etc. A thickness of the current collector may be in the range of 3 μm to 500 μm, but is not limited thereto.

A method of manufacturing the above-described electrode for a lithium secondary battery of the present invention is not particularly limited. However, a slurry for the first active material layer and a slurry for the second active material layer may be separately prepared, and then sequentially applied onto the current collector to form the first active material layer and the second active material layer, which are then dried and pressed to manufacture the electrode. Such a manufacturing method will be described in detail in Examples below.

The electrode for a lithium secondary battery of the present invention may exhibit high capacity, low resistance, and high output characteristics, thereby being suitably applied to a lithium secondary battery requiring a high capacity and a high output power. Therefore, in one embodiment of the present invention, provided is a lithium secondary battery including the electrode for a lithium secondary battery of the present invention.

The lithium secondary battery includes the electrode for a lithium secondary battery of the present invention as a positive electrode or a negative electrode, a separator disposed between the positive electrode and the negative electrode, and an electrolyte.

The separator separates the negative electrode and the positive electrode and provides a movement path for lithium ions, and any separator may be used as long as it is commonly used in lithium batteries. In other words, a separator having high moisture retention ability for an electrolyte as well as low resistance to the transfer of electrolyte ions may be used. For example, the separator may be selected from a glass fiber, polyester, TEFLON, polyethylene, polypropylene, polytetrafluoroethylene (PTFE), or a combination thereof, and may have a nonwoven fabric type or a woven fabric type. For example, a polyolefin-based polymer separator such as polyethylene, polypropylene, etc. is mainly used in lithium ion batteries. A coated separator containing a ceramic component or a polymer material may be used to secure heat resistance or mechanical strength. Optionally, the separator may be used in a single layer or multi-layer structure.

As the electrolyte, an electrolyte solution containing a lithium salt and a non-aqueous organic solvent, an organic solid electrolyte, and an inorganic solid electrolyte, which are usually used in lithium secondary batteries, may be used.

The electrolyte solution includes a non-aqueous organic solvent and a lithium salt.

The non-aqueous organic solvent functions as a medium through which ions involved in an electrochemical reaction of the battery may move.

As the non-aqueous organic solvent, carbonate-based, ester-based, ether-based, ketone-based, alcohol-based, or aprotic solvents may be used. The carbonate-based solvents may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), etc. The ester-based solvents may include methyl acetate, ethyl acetate, n-propyl acetate, 1,1-dimethylethyl acetate, methyl propionate, ethyl propionate, γ-butyrolactone, decanolide, valerolactone, mevalonolactone, caprolactone, etc. The ether-based solvents may include dibutyl ether, tetraglyme, diglyme, dimethoxyethane, 2-methyltetrahydrofuran, tetrahydrofuran, etc. The ketone-based solvents may include cyclohexanone, etc. The alcohol-based solvents may include ethyl alcohol, isopropyl alcohol, etc. The aprotic solvents may include nitriles such as R—CN (wherein R is a C2 to C20 linear, branched, or cyclic hydrocarbon, and may include double bonds, aromatic rings, or ether bonds), amides such as dimethylformamide, etc., dioxolanes such as 1,3-dioxolane, etc., sulfolanes, etc.

The non-aqueous organic solvent may be used alone or in a mixture of one or more thereof. When a mixture of one or more thereof is used, a mixing ratio may be controlled in accordance with the desired battery performance, which may be widely understood by those skilled in the art.

Further, it is preferable that a mixture of a cyclic carbonate and a chain carbonate is used as the carbonate-based solvent. In this case, when the cyclic carbonate and the chain carbonate are mixed together in a volume ratio of about 1:1 to about 1:9, the electrolyte solution may have enhanced performance.

The non-aqueous organic solvent may further include an aromatic hydrocarbon-based organic solvent in addition to the carbonate-based solvent. At this time, the carbonate-based solvent and the aromatic hydrocarbon-based organic solvent may be mixed together in a volume ratio of about 1:1 to about 30:1.

The non-aqueous electrolyte may further include vinylene carbonate or an ethylene carbonate-based compound in order to improve the lifespan of the battery.

Representative examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, vinylene ethylene carbonate, etc. When the vinylene carbonate or the ethylene carbonate-based compound is further used, its amount may be appropriately adjusted to improve the lifespan.

The lithium salt is a material that is dissolved in the non-aqueous organic solvent to act as a supply source of lithium ions in the battery, enables the basic operation of the lithium secondary battery, and improves lithium ion transfer between the positive and negative electrodes. Representative examples of the lithium salt may include $LiPF_6$, $LiBF_4$, $LiSbF_6$, $LiAsF_6$, $LiCAF_9SO_3$, $LiClO_4$, $LiAlO_2$, $LiAlCH_4$, $LiN(C_xF_{2x+1}SO_2)(C_yF_{2y+1}SO_2)$ (wherein x and y are natural numbers), LiCl, LiI, $LiB(C_2O_4)_2$ (lithium bis(oxalato) borate; LiBOB), or a combination thereof, which may be included as a supporting salt. A concentration of the lithium salt may be preferably in the range of 0.1 M to 2.0 M. When the lithium salt is included within the above concentration range, electrolyte performance and lithium ion mobility may be enhanced due to optimal electrolyte conductivity and viscosity.

Examples of the organic solid electrolyte may include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, polymers containing ionic dissociation groups, etc.

Examples of the inorganic solid electrolyte may include nitrides, halides, and sulfates of Li, such as $Li_3N$, LiI, $Li_3NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, etc.

The lithium secondary battery of one embodiment may be used in unit cells serving as a power source for small-scale devices, and may also be used as a unit cell of a middle or large-scale battery module including a plurality of battery cells. Furthermore, a battery pack including the battery module may be configured.

Hereinafter, preferred examples will be provided for better understanding of the present invention. However, the following examples are provided only for illustrating the present invention, but it is apparent to those skilled in the art that various changes and modifications can be made within the scope and the technical sprit of the present invention, and such changes and modifications belong to the appended claims.

EXAMPLE

In the following Examples and Comparative Examples, D50 of active materials was measured by a laser diffraction method.

In detail, 1 mg of the active material to be measured was dispersed in 30 g of distilled water, and then introduced into a laser diffraction particle size analyzer (Microtrac S3500). The particle size distribution was determined by measuring the diffraction pattern difference according to the particle size, when a laser beam passed through particles. D50 was determined by calculating the particle size at the 50% point on the cumulative distribution of the number of particles according to the particle size in the analyzer.

Example 1

(1) Manufacture of Positive Electrode $Li(Ni_{0.6}Mn_{0.2}Co_{0.2})O_2$ having a D50 particle size of 8.9 μm as a positive electrode active material A, $Li(Ni_{0.6}Mn_{0.2}Co_{0.2})O_2$ having a D50 particle size of 3.7 μm as a positive electrode active material B, carbon black as a conductive material, and polyvinylidene fluoride (PVdF) as a binder were used to manufacture a positive electrode by the following method.

The active materials, in which the positive electrode active material A and the positive electrode active material B were mixed at a weight ratio of 7:3, were mixed at a weight ratio of active material:conductive material:binder=97:1:2, and N-methylpyrrolidone (NMP) was used as a solvent to prepare a slurry for a first active material layer.

Further, the active materials, in which the positive electrode active material A and the positive electrode active material B were mixed at a weight ratio of 9:1, were mixed at a weight ratio of active material:conductive material:binder=97:1:2, and N-methylpyrrolidone (NMP) was used as a solvent to prepare a slurry for a second active material layer.

The prepared slurry for a first active material layer was applied at a loading capacity of 14 mg/cm² onto an aluminum foil having a thickness of 12 μm to form a first active material layer, and the prepared slurry for a second active material layer was applied at a loading capacity of 14 mg/cm² onto the surface of the first active material layer, and dried at 120° C. for 10 min to form a second active material layer. Then, roll pressing was performed to manufacture a positive electrode.

(2) Manufacture of Lithium Secondary Battery

Artificial graphite as a negative electrode active material, carbon black as a conductive material, carboxymethyl cellulose (CMC) as a thickener, and styrene-butadiene rubber (SBR) as a binder were mixed at a weight ratio of 96:1:1:2 to prepare a negative electrode slurry.

The prepared negative electrode slurry was applied onto a copper foil having a thickness of 8 μm, and dried at 100° C. for 10 min. Then, roll pressing was performed to manufacture a negative electrode.

The positive electrode and the negative electrode were used, and a polyethylene separator (thickness: 17 μm) was used as a separator, and electrolyte (1 M lithium hexafluorophosphate ($LiPF_6$), ethylene carbonate (EC)/dimethylcarbonate (DMC)=3/7 volume ratio) was injected to finally manufacture a coin full cell-type lithium secondary battery.

Example 2

(1) Manufacture of Positive Electrode $Li(Ni_{0.6}Mn_{0.2}Co_{0.2})O_2$ having a D50 particle size of 10.4 μm as a positive electrode active material A, $Li(Ni_{0.6}Mn_{0.2}Co_{0.2})O_2$ having a D50 particle size of 5.8 μm as a positive electrode active material B, carbon black as a conductive material, and polyvinylidene fluoride (PVdF) as a binder were used to manufacture a positive electrode by the following method.

The active materials, in which the positive electrode active material A and the positive electrode active material B were mixed at a weight ratio of 7:3, were mixed at a weight ratio of active material:conductive material:binder=97:1:2, and N-methylpyrrolidone (NMP) was used as a solvent to prepare a slurry for a first active material layer.

Further, the active materials, in which the positive electrode active material A and the positive electrode active material B were mixed at a weight ratio of 9:1, were mixed at a weight ratio of active material:conductive material:binder=97:1:2, and N-methylpyrrolidone (NMP) was used as a solvent to prepare a slurry for a second active material layer.

The prepared slurry for a first active material layer was applied at a loading capacity of 14 mg/cm² onto an aluminum foil having a thickness of 12 μm to form a first active material layer, and at the same time, the prepared slurry for a second active material layer was applied at a loading capacity of 14 mg/cm² onto the surface of the first active material layer, and dried at 120° C. for 10 min to form a second active material layer. Then, roll pressing was performed to manufacture a positive electrode.

(2) Manufacture of Lithium Secondary Battery

A lithium secondary battery was manufactured by using the same negative electrode, separator, and electrolyte, and the same method as in (2) of Example 1, except that the positive electrode manufactured in (1) was used as a positive electrode.

Comparative Example 1

(1) Manufacture of Positive Electrode

The slurry for a first active material layer of Example 1 was applied at a loading capacity of 28 mg/cm² onto the surface of an aluminum foil having a thickness of 12 μm, and dried at 120° C. for 10 min. Then, roll pressing was performed to manufacture a positive electrode having a single active material layer.

(2) Manufacture of Lithium Secondary Battery

A lithium secondary battery was manufactured by using the same negative electrode, separator, and electrolyte, and the same method as in (2) of Example 1, except that the positive electrode manufactured in (1) was used as a positive electrode.

Comparative Example 2

(1) Manufacture of Positive Electrode

A positive electrode of Comparative Example 2 was manufactured in the same manner as in (1) of Example 1, except that a mixture of the positive electrode active material A:positive electrode active material B=5:5 (weight ratio) was used as active materials included in a slurry for a second active material layer.

(2) Manufacture of Lithium Secondary Battery

A lithium secondary battery was manufactured by using the same negative electrode, separator, and electrolyte, and the same method as in (2) of Example 1, except that the positive electrode manufactured in (1) was used as a positive electrode.

Comparative Example 3

(1) Manufacture of Positive Electrode

A positive electrode of Comparative Example 3 was manufactured in the same manner as in (1) of Example 1, except that a mixture of the positive electrode active material A:positive electrode active material B=5:5 (weight ratio) was used as active materials included in a slurry for a first active material layer, and a mixture of the positive electrode active material A:positive electrode active material B=7:3 (weight ratio) was used as active materials included in a slurry for a second active material layer (2) Manufacture of Lithium Secondary Battery A lithium secondary battery was manufactured by using the same negative electrode, separator, and electrolyte, and the same method as in (2) of Example 1, except that the positive electrode manufactured in (1) was used as a positive electrode.

Experimental Example 1

With respect to the lithium secondary batteries manufactured in Examples and Comparative Examples, battery resistance characteristics were evaluated at 25° C. using a constant current/constant potential-controllable charger/discharger.

In detail, operational conditions of each battery are as follows.

Charging: 0.1C, CC/CV, 4.3V, 0.005 C cut-off
Discharging: 0.1C, CC, 2.0V

Referring to the drawing, it was confirmed that Examples 1 and 2 exhibited remarkably reduced resistance despite having the same loading capacity, as compared with Comparative Example 1 configured to have the single layer. However, as in Comparative Example 2, when the ratio of the large particle size active material in the first active material layer is higher than that in the second active material layer, there was no effect of improving resistance. Rather, Comparative Example 3 showed the increased resistance.

The invention claimed is:

1. An electrode for a lithium secondary battery, the electrode comprising a current collector; a first active material layer formed on the current collector; and a second active material layer formed on the first active material layer,
wherein the first and second active material layers each include active materials comprising an active material A having a D50 particle size of 7 μm to 15 μm and an active material B having a D50 particle size of 2 μm or more to less than 7 μm,
the first and second active material layers are different from each other in term of a weight ratio of the active material A:the active material B, and
a ratio of the active material A in the second active material layer is higher than that in the first active material layer,
the weight ratio of the active material A:the active material B in the second active material layer is higher than 70:30, and
the active material A and the active material B have the same chemical formula.

2. The electrode for a lithium secondary battery of claim 1, wherein the weight ratio of the active material A:the active material B in the first active material layer is higher than 50:50 and 70:30 or less, and
the weight ratio of the active material A:the active material B in the second active material layer is higher than 70:30 and 95:5 or less.

3. The electrode for a lithium secondary battery of claim 1, wherein the weight ratio of the active material A:the active material B in the first active material layer is 60:40 to 70:30, and
the weight ratio of the active material A:the active material B in the second active material layer is 80:20 to 90:10.

4. The electrode for a lithium secondary battery of claim 1, wherein the D50 particle size of the active material A is 7 μm to 11 μm, and the D50 particle size of the active material B is 2 μm to 6 μm.

5. The electrode for a lithium secondary battery of claim 1, wherein the D50 particle size of the active material A is 8 μm to 10.5 μm, and the D50 particle size of the active material B is 3.5 μm to 6 μm.

6. The electrode for a lithium secondary battery of claim 1, wherein the active material A and the active material B are homogeneous or heterogeneous positive electrode active materials.

7. The electrode for a lithium secondary battery of claim 6, wherein the homogeneous or heterogeneous positive electrode active material comprises lithium-manganese oxides, lithium-cobalt oxides, lithium-nickel oxides, lithium-nickel-manganese oxides, lithium-nickel-cobalt oxides, lithium-manganese-cobalt oxides, lithium-nickel-manganese-cobalt oxides, or lithium-nickel-cobalt-transition metal (M) oxide, wherein M is one or more selected from the group consisting of Al, Fe, V, Cr, Ti, Ta, Mg, and Mo.

8. The electrode for a lithium secondary battery of claim 6, wherein the active material A and the active material B comprise the homogeneous positive electrode active compounds of lithium-nickel-manganese-cobalt oxides.

9. The electrode for a lithium secondary battery of claim 1, wherein a loading capacity deviation between the first active material layer and the second active material layer is 0% to 10%.

10. The electrode for a lithium secondary battery of claim 1, wherein each of the first and second active material layers has a loading capacity of 12 mg/cm$^2$ to 16 mg/cm$^2$.

11. The electrode for a lithium secondary battery of claim 1, wherein each of the first and second active material layers has a thickness of 35 μm to 45 μm.

12. The electrode for a lithium secondary battery of claim 1, wherein the active materials A and B are lithium-manganese oxides, lithium-cobalt oxides, lithium-nickel oxides, lithium-nickel-manganese oxides, lithium-nickel-cobalt oxides, lithium-manganese-cobalt oxides, lithium-nickel-manganese-cobalt oxides, or lithium-nickel-cobalt-transition metal (M) oxide wherein M is one or more selected from the group consisting of Al, Fe, V, Cr, Ti, Ta, Mg, and Mo.

13. The electrode for a lithium secondary battery of claim 12, wherein the lithium-manganese oxides comprises $LiMnO_2$ or $LiMn_2O_4$.

14. The electrode for a lithium secondary battery of claim 12, wherein the lithium-cobalt oxides comprises $LiCoO_2$.

15. The electrode for a lithium secondary battery of claim 12, wherein the lithium-nickel oxides comprise $LiNiO_2$.

16. The electrode for a lithium secondary battery of claim 12, wherein the lithium-nickel-manganese oxides comprise $LiNi_{1-Y}Mn_YO_2$ where $0<Y<1$, or $LiMn_{2-Z}Ni_ZO_4$ where $0<Z<2$.

17. The electrode for a lithium secondary battery of claim 12, wherein the lithium-nickel-cobalt oxides comprise $LiNi_{1-Y1}Co_{Y1}O_2$ where $0<Y1<1$.

18. The electrode for a lithium secondary battery of claim 12, wherein the lithium-manganese-cobalt oxides comprise $LiCo_{1-Y2}Mn_{Y2}O_2$ where $0<Y2<1$ or $LiMn_{2-Z1}Co_{Z1}O_4$ where $0<Z1<2$.

* * * * *